US009491357B2

(12) United States Patent
Shohara et al.

(10) Patent No.: US 9,491,357 B2
(45) Date of Patent: *Nov. 8, 2016

(54) IMAGE-PROCESSING SYSTEM AND IMAGE-PROCESSING METHOD IN WHICH A SIZE OF A VIEWING ANGLE AND A POSITION OF A VIEWING POINT ARE CHANGED FOR ZOOMING

(71) Applicant: RICOH COMPANY, LTD., Tokyo (JP)

(72) Inventors: Makoto Shohara, Hachioji (JP); Nozomi Imae, Yokohama (JP); Toru Harada, Kawasaki (JP); Hideaki Yamamoto, Yokohama (JP); Yasuo Ueda, Sagamihara (JP); Yoichi Ito, Machida (JP); Satoshi Sawaguchi, Yokohama (JP); Hirokazu Takenaka, Kawasaki (JP); Kensuke Masuda, Kawasaki (JP); Hiroyuki Satoh, Yokohama (JP)

(73) Assignee: RICOH COMPANY LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,282

(22) Filed: Oct. 23, 2014

(65) Prior Publication Data

US 2015/0042647 A1 Feb. 12, 2015

Related U.S. Application Data

(63) Continuation of application No. 14/104,448, filed on Dec. 12, 2013.

(30) Foreign Application Priority Data

Dec. 26, 2012 (JP) .................................. 2012-282899

(51) Int. Cl.
*G09G 5/00* (2006.01)
*H04N 5/232* (2006.01)
(Continued)

(52) U.S. Cl.
CPC ......... *H04N 5/23238* (2013.01); *G06T 15/205* (2013.01); *G06T 17/00* (2013.01)

(58) Field of Classification Search
None
See application file for complete search history.

(56) References Cited

U.S. PATENT DOCUMENTS 6,556,206 B1 * 4/2003 Benson et al. ................ 345/473
7,006,707 B2 * 2/2006 Peterson ....................... 382/285

(Continued)

FOREIGN PATENT DOCUMENTS

JP 2007-233996 9/2007
JP 2013-057993 3/2013

OTHER PUBLICATIONS

J. Kopf, et al, "Capturing and Viewing Gigapixel Images", ACM Transactions on Graphics (TOG)—Proceedings of ACM SIGGRAPH 2007, vol. 26, Issue 3, Jul. 2007, Article No. 93, ACM New York, 10 pages.

(Continued)

*Primary Examiner* — Anh-Tuan V Nguyen
(74) *Attorney, Agent, or Firm* — Oblon, McClelland, Maier & Neustadt, L.L.P.

(57) ABSTRACT

An image-processing system includes a receiver which receives an input value defining an output range, a generator which generates a three-dimensional model having a target image attached to a three-dimensional conformation, a decision part which decides a position of a viewing point and a viewing angle in accordance with the input value, and a projector which projects the three-dimensional model from the viewing point, wherein the decision part changes a range of a target image inside a viewing field by changing the viewing angle preferentially when the input value is in a first range, and changes the range of the target image inside the viewing field by changing the viewing point preferentially when the input value is in a second range which is a wider-angle side than that of the first range.

12 Claims, 11 Drawing Sheets

(51) Int. Cl.
*G06T 15/20* (2011.01)
*G06T 17/00* (2006.01)

(56) References Cited

U.S. PATENT DOCUMENTS

| | | | |
|---|---|---|---|
| 8,624,958 B2* | 1/2014 | Mendoza et al. | 348/39 |
| 2003/0095131 A1* | 5/2003 | Rondinelli | 345/582 |
| 2004/0001146 A1* | 1/2004 | Liu et al. | 348/207.99 |
| 2004/0004621 A1* | 1/2004 | Oxaal | 345/582 |
| 2005/0237324 A1* | 10/2005 | Guhring | 345/419 |
| 2007/0124783 A1* | 5/2007 | Ahiska et al. | 725/105 |
| 2007/0183685 A1 | 8/2007 | Wada et al. | |
| 2008/0144968 A1* | 6/2008 | Cohen et al. | 382/276 |
| 2008/0158226 A1* | 7/2008 | Shimizu | 345/420 |
| 2010/0054578 A1* | 3/2010 | Ekpar | 382/154 |
| 2010/0054628 A1* | 3/2010 | Levy et al. | 382/284 |
| 2010/0302280 A1* | 12/2010 | Szeliski et al. | 345/660 |
| 2011/0273451 A1* | 11/2011 | Salemann | 345/427 |
| 2011/0316968 A1* | 12/2011 | Taguchi et al. | 348/36 |
| 2012/0098926 A1* | 4/2012 | Kweon | 348/36 |
| 2013/0044108 A1* | 2/2013 | Tanaka et al. | 345/419 |
| 2013/0057542 A1 | 3/2013 | Takenaka et al. | |

OTHER PUBLICATIONS

English translation of Office Action issued on Nov. 18, 2014 in the corresponding Japanese Patent Application No. 2014-198857 (Office Action previously submitted and included herewith).

* cited by examiner

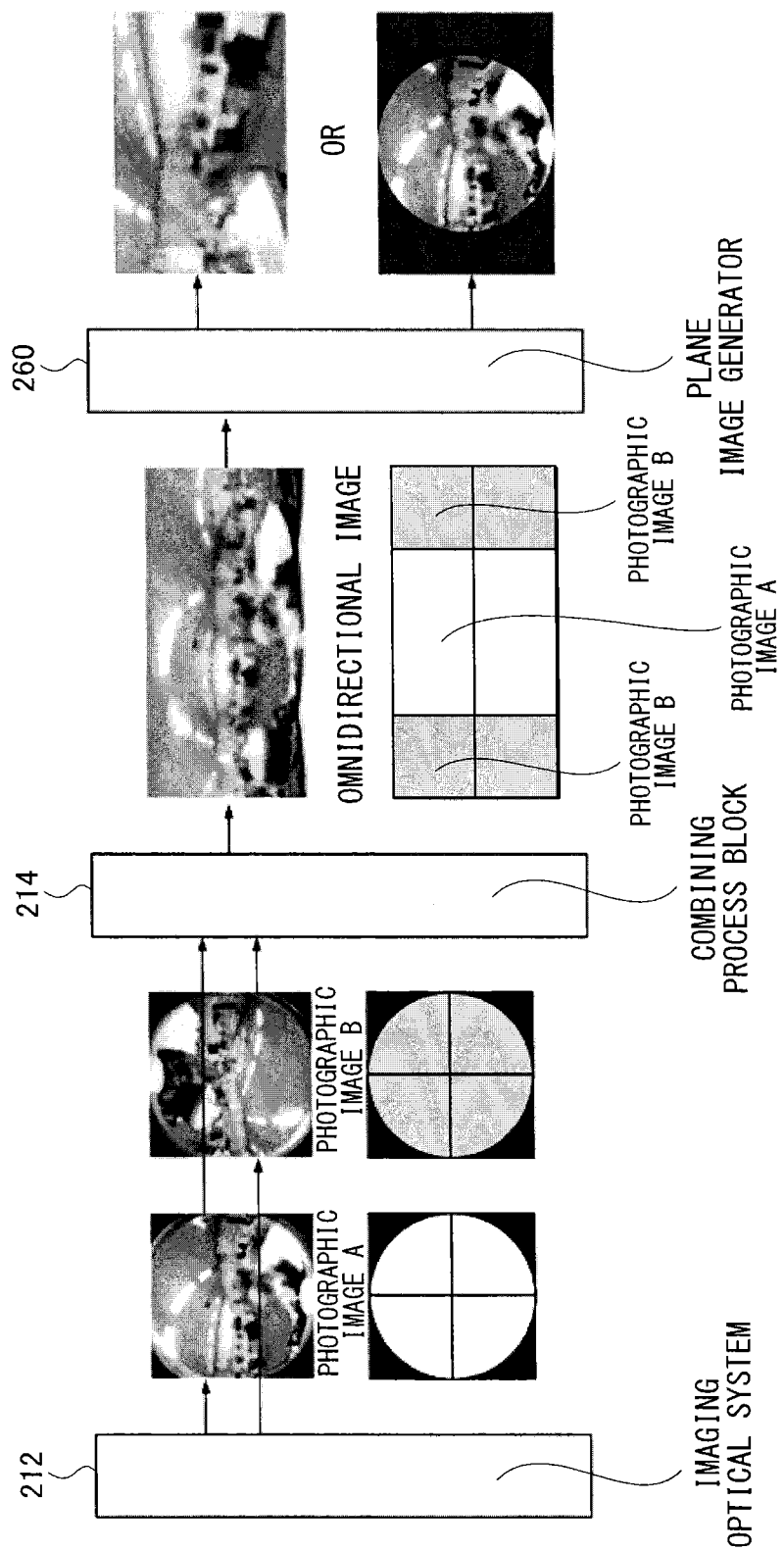

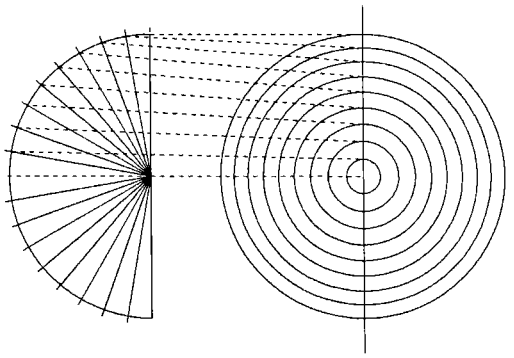
FIG.4A
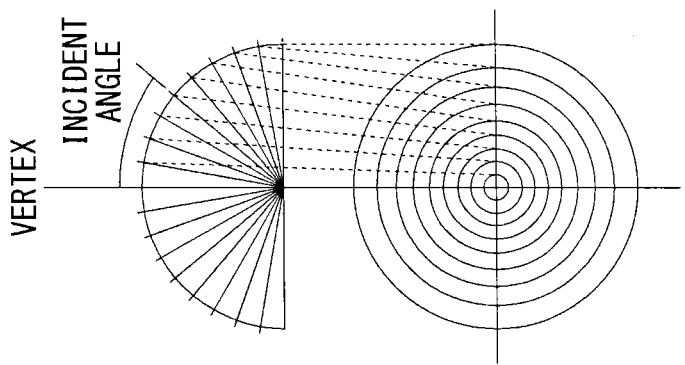
FIG.4B  FIG.4C
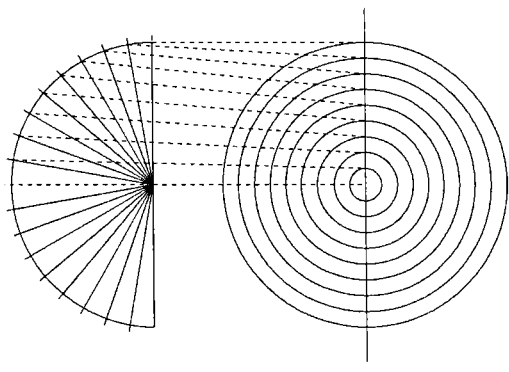
FIG.4D
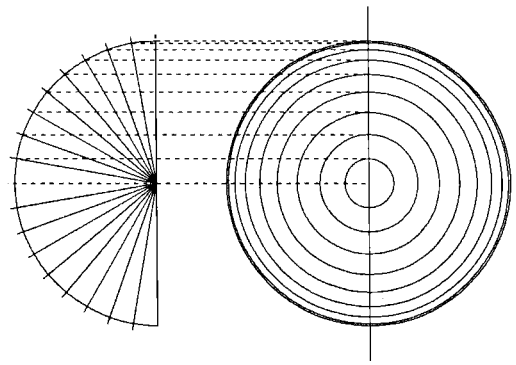

FIG.11A
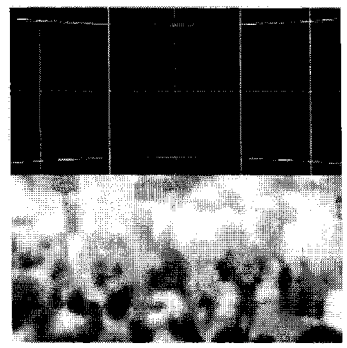 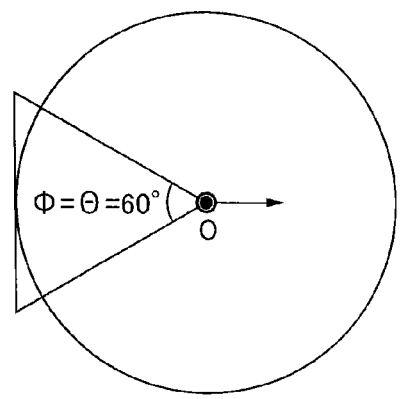
FIG.11B
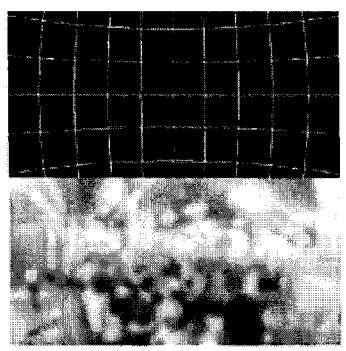 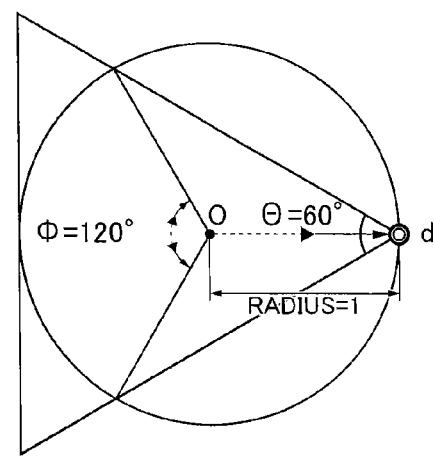
FIG.11C
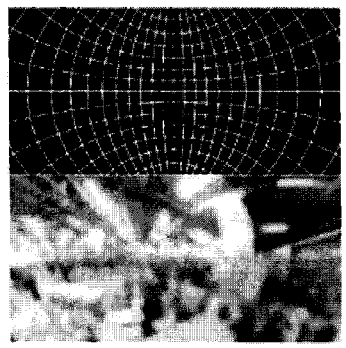 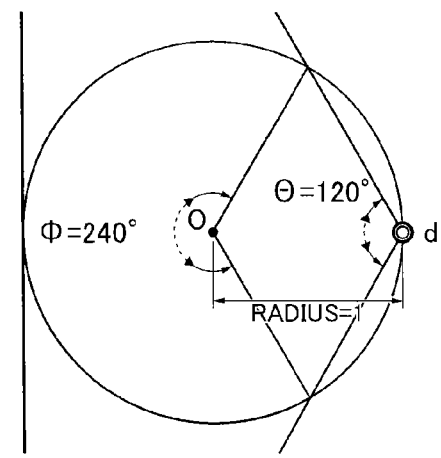

FIG.11D
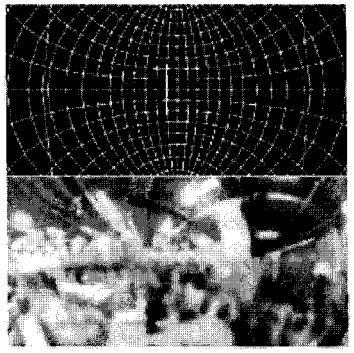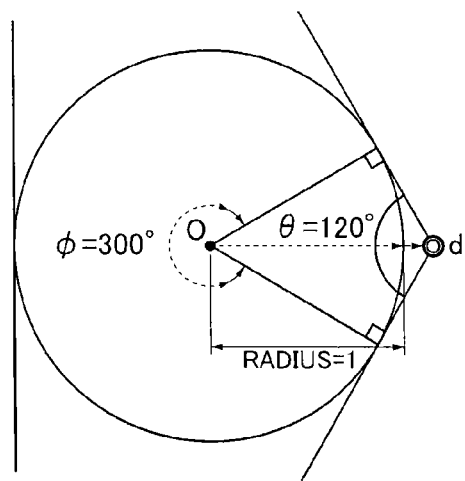
FIG.11E
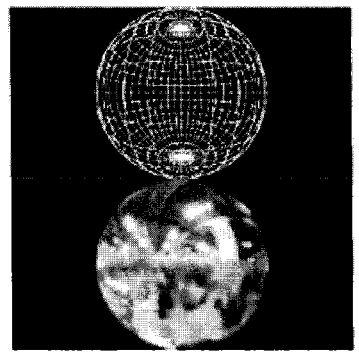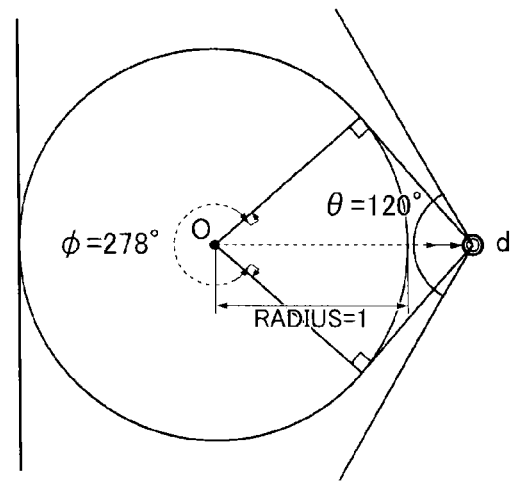

IMAGE-PROCESSING SYSTEM AND IMAGE-PROCESSING METHOD IN WHICH A SIZE OF A VIEWING ANGLE AND A POSITION OF A VIEWING POINT ARE CHANGED FOR ZOOMING

CROSS-REFERENCE TO RELATED APPLICATION

The present application is a continuation of U.S. application Ser. No. 14/104,448, filed on Dec. 12, 2013, which is based on and claims priority from Japanese Patent Application No. 2012-282899, filed on Dec. 26, 2012, the disclosures of each of which are hereby incorporated by reference herein in their entirety.

BACKGROUND

Field of the Invention

The present invention relates to an improvement of an image-processing technique, more specifically, to an image-processing system, an image-processing method, and an image-processing program for projecting a wide-angle image according to a three-dimensional model.

A panoramic image viewer as a display system for displaying on a flat surface display an image shot by a camera and so on is heretofore known. The panoramic image viewer is a system which combines more than one image of a partly overlapped object image shot from different directions and displays the combined image on a display.

A well-known panoramic image viewer has various functions which are capable of changing display ranges such as pan (side-to-side movement of viewing field), tilt (up-and-down movement of viewing field), and zoom (magnification and reduction). The panoramic image viewer often has a technique of projecting on a plane surface an image attached on a side surface of a circular cylinder or an outside surface of a sphere with a view from a gravity center of the circular cylinder or the sphere. In this instance, on a flat surface display, an image attached on a three-dimensional surface is projected to be a plane image and is displayed in accordance with each setting value of pan, tilt and zoom set by a user. The image has a focal point according to a side surface of the circular cylinder or a surface of a sphere.

However, the existing panoramic image viewer has a problem in that distortion or the like is generated on the edge of the field of view in an image when the field of view becomes wider than a certain extent by a changing operation of a display range, in particular, by zooming.

As a technique designed for displaying a wide angle image such as a panoramic image, a non-patent document (hereinafter, Non-patent Doc. 1), J. Kopf, et al, "Capturing and Viewing Gigapixel Images", ACM Transactions on Graphics (TOG)—Proceedings of ACM SIGGRAPH 2007, Volume 26, Issue 3, July 2007, Article No. 93, ACM New York, is known. Non-patent Doc. 1 discloses a viewer displaying an image with a field of view capable of obtaining a panoramic image. The viewer disclosed in Non-patent Doc. 1 continuously controls its projection method in order to perform a perspective projection in a small field of view and perform a cylindrical projection or a spherical projection in a wide field of view.

However, because the common art in Non-patent Doc. 1 is such that the projection method is changed according to zoom, the process is complicated and a high performance of calculation is necessary for processing in real time. On the other hand, recently, a panoramic image viewer is frequently provided with not only a personal computer but also a smartphone or a tablet terminal having a relatively low performance of calculation. In such an information terminal device having a low performance of calculation, it is difficult to perform a complicated process such as a real time display with about 30 fps (Frame per Second) described in Non-patent Doc. 1.

Recently, an information terminal device often includes a GPU (Graphics Processing Unit) as a graphic calculator in addition to a CPU. The GPU typically includes a calculating function corresponding to an API (Application Programming Interface) such as an Open GL and so on and is capable of a high-speed image-processing calculation. However, because the GPU provided in a smartphone and so on is a subset version of the Open GL, the calculation model is relatively simple.

Considering the above-described circumstances, the development of a technique is desired such that the distortion or the like caused from that the top/bottom and left/right edges of an object becoming enlarged while being displayed with a wide field of view can be lowered even in an information terminal device having a limited performance of calculation, at the same time as providing a high-speed display.

SUMMARY

The present invention has been made in view of the problems in the above-described existing art. An object of the present invention is to provide an image-processing system, an image-processing method, and a program having a partly-reduced requirement for calculation performance, for displaying a wide field of view of panoramic image display which is capable of lowering the distortion or the like caused from the top/bottom and left/right edges of the object being enlarged, and a high-speed display.

In order to achieve the object, the embodiment of the present invention provides: an image-processing system including a receiver which receives an input value defining an output range, a generator which generates a three-dimensional model having a target image attached to a three-dimensional conformation, a decision part which decides a position of a viewing point and a viewing angle in accordance with the input value, and a projector which projects the three-dimensional model from the viewing point, wherein the decision part changes a range of a target image inside a viewing field by changing the viewing angle preferentially when the input value is in a first range, and changes the range of the target image inside the viewing field by changing the viewing point preferentially when the input value is in a second range which is a wider-angle side than that of the first range.

BRIEF DESCRIPTION OF THE DRAWINGS

FIG. 3 is a flow chart of image data during the omnidirectional image output process.

FIGS. 4A-4D illustrate examples of a projection method employed in the case of a fish-eye lens.

FIGS. 11A-11E illustrate a method of determining the image generation parameter according to a designed value of zoom.

DETAILED DESCRIPTION OF THE PREFERRED EMBODIMENT

Embodiment

Hereinbelow, a description of an embodiment according to the present invention will be given, but the embodiment of the present invention is not limited to the following embodiment. In the description of the embodiment, an omnidirectional image display system including an omnidirectional imaging device and an image processor which receives an image by the omnidirectional imaging device, and generates an output image to a display device and so on is described as an example of an image-processing system.

Figure 1:
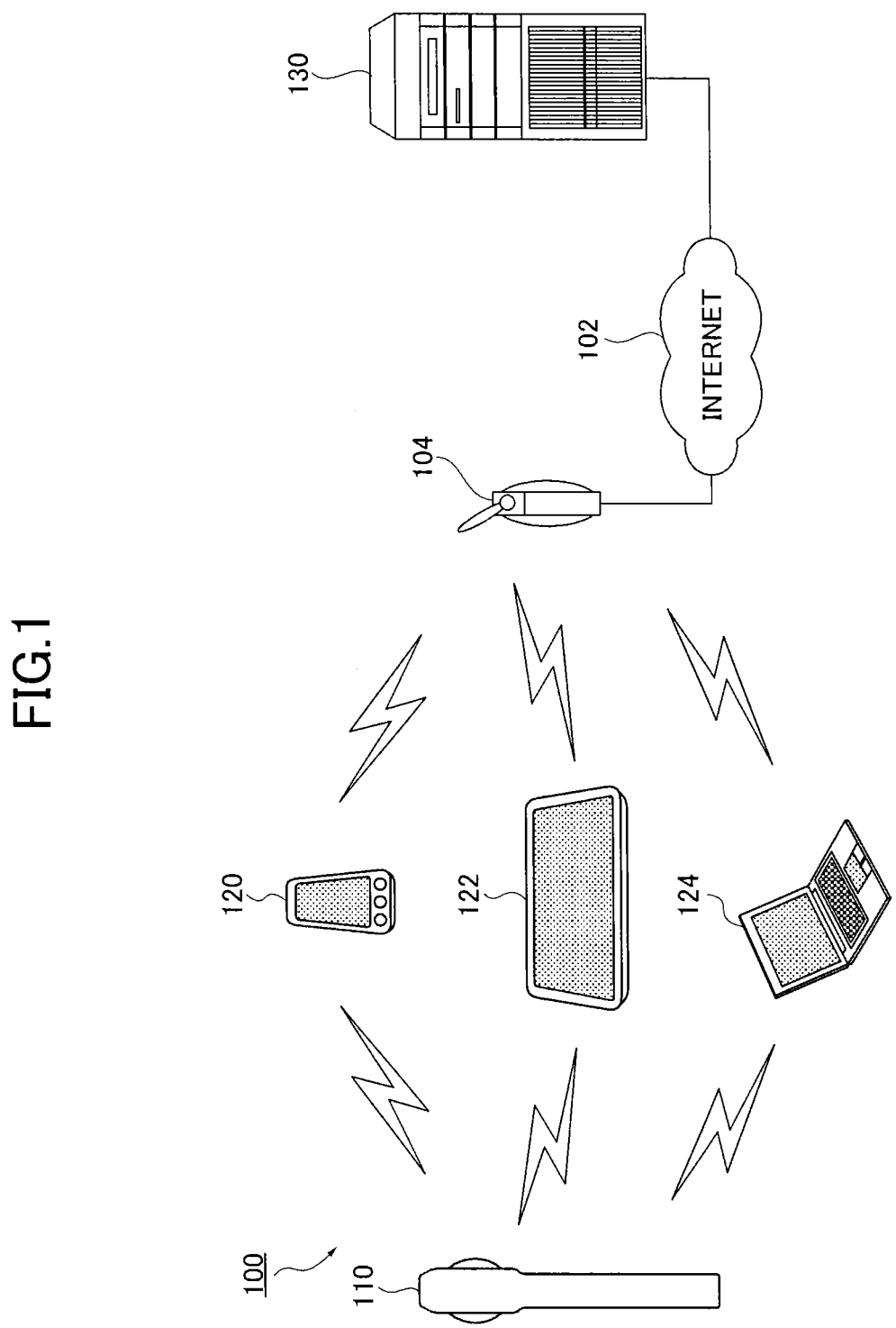
FIG. 1 schematically illustrates an omnidirectional image display system according to an embodiment of the present invention.

FIG. 1 schematically illustrates a configuration of an omnidirectional image display system 100 according to the embodiment of the present invention. The omnidirectional image display system 100 shown in FIG. 1 includes: an omnidirectional imaging device 110; a smartphone 120; a tablet terminal 122; and a personal computer 124. Each of the smartphone 120, tablet terminal 122 and personal computer 124 constitutes the image processor according to the present embodiment having a function as an image viewer which displays an image obtained by the omnidirectional imaging device 110 on a display and so on.

In the present embodiment as shown in FIG. 1, the omnidirectional imaging device 110 and image processors 120 to 124 are connected wirelessly by a wireless LAN (Local Area Network), wireless USB (Universal Serial Bus), Bluetooth (Registered Trademark), or the like. However, the connection among these is not limited to the above connection. The image in a predetermined format obtained by the omnidirectional imaging device 110 is sent to the image processors 120 to 124 via wireless communication and displayed on the display device provided in the image processors 120 to 124 after a predetermined image process. Although the above-described connecting condition is an example, it is also possible to use a wired line such as a wired LAN, wired USB and so on.

In the embodiment described herein, the omnidirectional imaging device 110 includes two imaging optical systems each including a lens optical system and a solid-state imaging element, and generates an image by shooting from each direction per imaging optical system. The lens optical system can be configured as a fish-eye lens having six groups of seven lenses. The fish-eye lens has an angle of field larger than 180 degrees (=360 degrees/n; n=2), preferably 185 degrees or more, and more preferably 190 degrees or more. In the present embodiment, the fish-eye lens includes a so-called wide-angle lens and super wide-angle lens.

The omnidirectional imaging system 110 combines images imaged by each of a plurality of solid-state imaging elements and generates an image in a solid angle 4π radian (hereinafter, referred to as omnidirectional image). The omnidirectional image has an omnidirectional view which can be seen from a shooting point. As described above, because the fish-eye lens has an angle of field of more than 180 degrees, the shooting range is overlapped in the part over 180 degrees of the image obtained by each imaging optical system. When combining the images, the overlapped part is referred to as basic data indicating the same subject, and then the omnidirectional image is generated.

In the embodiment described herein, the omnidirectional image in a solid angle 4π radian is generated. However, an image having 360 degrees in a horizontal plane surface, that is, a panoramic image can be also obtained by another embodiment. In addition, the embodiment described herein has the configuration including two imaging optical systems, but the number of imaging optical systems is not limited. It is possible in another embodiment that the omnidirectional imaging device 110 include an imaging device having three or more fish-eye lenses in the optical system and a function to generate the omnidirectional image according to plural images obtained by the three or more fish-eye lenses. Furthermore, it is also possible that the omnidirectional imaging device 110 include an imaging device having a single fish-eye lens in the optical system and a function to generate an omnidirectional image according to plural images of different directions obtained by the single fish-eye lens.

The generated omnidirectional image is sent to the external image processors 120 to 124 by communication in a certain format. Otherwise, it is output to an external recording medium such as an SD card (Registered Trademark), or Compact flash (Registered Trademark).

The image processors 120 to 124 receive the omnidirectional image via connection, or receive the omnidirectional image via an external recording medium in which the omnidirectional image is recorded, and at once save the omnidirectional image to the recording device thereof. The image processors 120 to 124 are capable of generating an image to be output and displayed on the display disposed therein or the plane surface display device such as a projector which is connected thereto, from the obtained omnidirectional image. The generated output-image can be displayed on the plane surface display device. The image processors 120 to 124 are also capable of outputting the generated output-image in print on paper via an image formation device which is connected thereto. A detailed description of the process of generating the output-image from the omnidirectional image will be given later.

In the embodiment shown in FIG. 1, the omnidirectional imaging device 110 and the image processors 120 to 124 are connected to the Internet 102 through a communication device 104 such as an access point, a mobile router, or broadband router. An image display server 130 is provided on the Internet 102.

The image display server 130 shown in FIG. 1 receives the omnidirectional image sent from the omnidirectional imaging device 110 or the image processors 120 to 124. The image display server 130 stores and controls the received omnidirectional image. The image display server 130 also responds to a request for displaying the omnidirectional image from the image processors 120 to 124 or the other information processor generates the output image according to the omnidirectional image and sends the output image to the device of the requester. Thereby, the output image can be displayed on the plane display device disposed in the device of the requester.

The image display server 130 can be configured as a web server in a particular embodiment. The image display server 130 receives a request regarding the registration of the image including the omnidirectional image in accordance with the HTTP (Hyper Text Transfer Protocol), and stores the omnidirectional image. Furthermore, the image display server 130 receives a request for displaying the image where the intended omnidirectional image is specified for the output image, retrieves the specified omnidirectional image, generates the output image after the image process, and responds with the output image. In the device of the requester, the output image is displayed on the plane display device by a web browser after receiving the image. The output image is arbitrarily output in print by the web browser. In the present embodiment, the image display server 130 is also configured as an image processor generating the output image.

Figure 2:
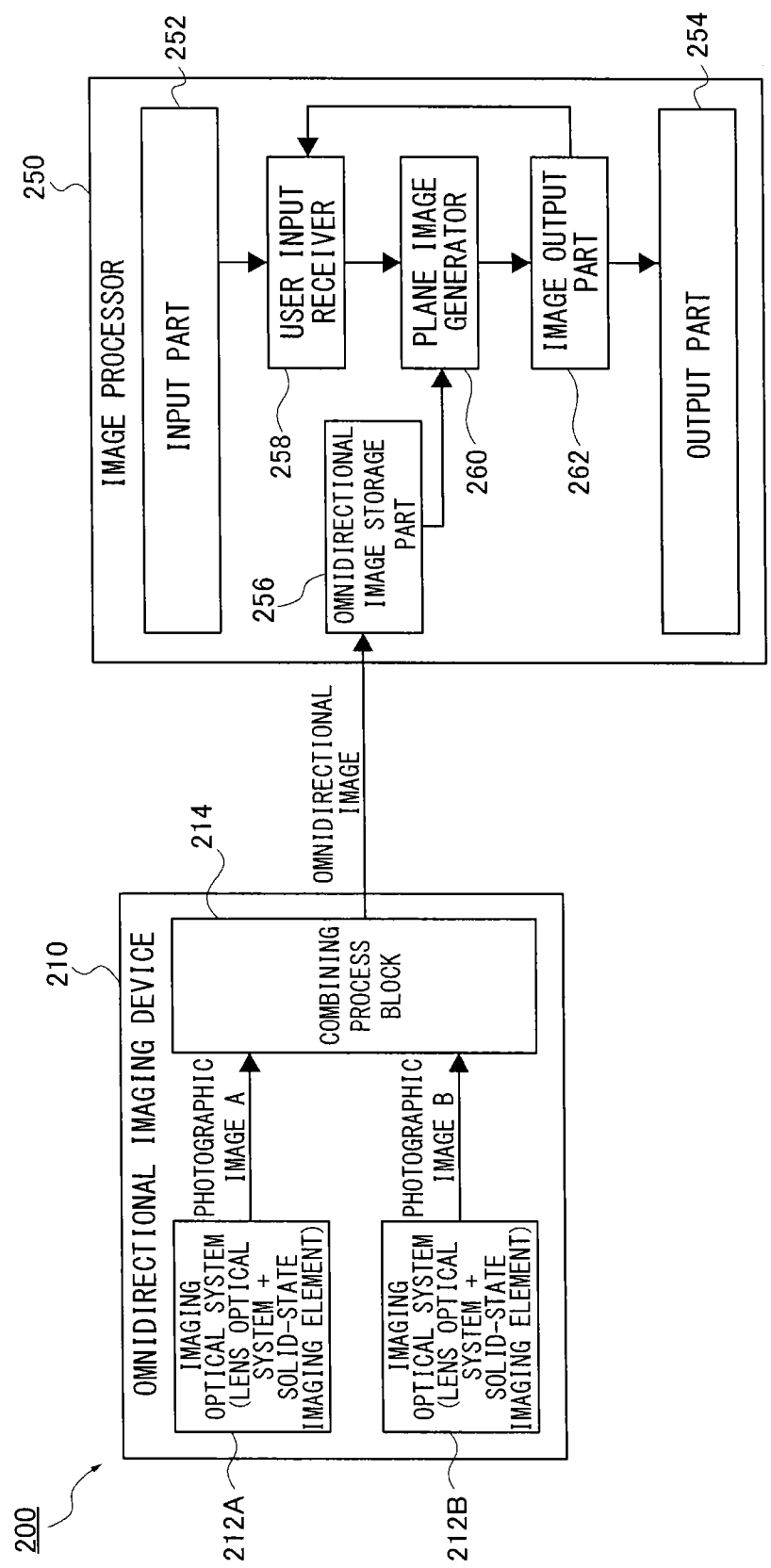
FIG. 2 is a block chart of a function of an omnidirectional image output process in the omnidirectional image display system according to the embodiment of the present invention.

Hereinbelow, the omnidirectional image output process which generates the output image from the omnidirectional image in the present embodiment will be described in detail with reference to FIGS. 2 to 12. FIG. 2 illustrates a function block 200 regarding the omnidirectional image output process in the omnidirectional image display system according to the present embodiment. The function block 200 shown in FIG. 2 includes a function block 210 on the omnidirectional imaging device 110, and a function block 250 on the image processors 120 to 124 and 130.

The function block 210 in the omnidirectional imaging device 110 includes two imaging optical systems 212A and 212B which image from each different direction and a combining process block 214 which generates and outputs the omnidirectional image upon the input of each image imaged by each of the imaging optical systems 212A and 212B.

The function block 250 of the image processor includes: an input part 252; an output part 254; an omnidirectional image storage part 256; a user input receiver (receiver, reception unit) 258; a plane image generator 260; and an image output part 262. The input part 252 includes input devices such as a touch panel, a mouse, and a keyboard. The output part 254 includes output devices such as a plane display device displaying the image-processing result according to an operation performed in the input part 252 by a user; and an image-forming device which outputs the image-processing result in print. The input part 252 and the output part 254 can be disposed within the image processor or the external device connected to the image processor.

The omnidirectional image storage part 256 stores the omnidirectional image which is imaged by the omnidirectional imaging device 110 and is input to the image processors 120 to 124 via the above-described connection or external recording medium. The user input receiver (receiver, reception unit) 258 receives the input value providing the output range of the omnidirectional image according to the operation based on the changing operation of output range performed through the input part 252, and sends the input value to the plane image generator 260.

As the changing operations of output range, there are a pan operation which moves the field of view side-to-side, a tilt operation which moves the field of view up-and-down, and a zoom operation which enlarges or reduces the range of the output image. As a result of the above changing operation, otherwise, a result of direct input, a pan designation value, tilt designation value and zoom designation value can be obtained as the input value providing the output range of the omnidirectional image.

The plane image generator 260 decides the parameter (hereinafter, referred to as image generation parameter) while generating the image according to the received input value, and generates the output image from the omnidirectional image according to the decided image generation parameter. The image output part 262 outputs the output image to the output part 254. The output image accomplishes a plane image in order to be displayed on the plane display device appropriately.

When the image processor performs as a web server such as the image display server 130, the configurations of the input part 252 and the output part 254 are as follows. That is, the input part 252 is configured as an HTTP receiver receiving an HTTP request regarding the image register. The output part 254 is configured as an HTTP sender returning the generated output image to a request sender as a response in response to the HTTP request regarding the image display.

FIG. 3 illustrates the data configuration and data flow of the image in the omnidirectional image-output process. The imaging optical system 212 according to the present embodiment generates two images by the imaging process. In the present embodiment, the light incident on the lens optical system is imaged on a light-receiving area of the corresponding solid-state imaging device, in accordance with the predetermined projecting method. The above photographic image is imaged by the two-dimensional solid-state imaging device having a plane surface area in the light-receiving area. The image has image data represented by a plane coordinate system. In the present embodiment, the lens is configured to be a so-called circular fish-eye lens which has an image circle having a smaller diameter than the diagonal line of the image. Accordingly, as indicated in FIG. 3 as the photographic images A and B, the image is obtained to have a configuration of the plane image including the whole image circle to which each photographing range is projected.

FIGS. 4A-4D illustrate an example of a projecting method which can be operated by a fish-eye lens. As the fish-eye lens, various configurations can be considered. As the projecting method for such a fish-eye lens, orthogonal projection (FIG. 4A), equidistant projection (FIG. 4B), stereographic projection (FIG. 4C), and equisolid angle projection (FIG. 4D) can be performed. In the embodiment described herein, the image photographed by a single fish-eye lens shows an approximate hemispherical view from the shooting position (running off from hemisphere where entire angle of field is over 180 degrees). Then, as shown in FIGS. 4A-4D, the image is generated to have an image height r corresponding to an incident angle β to the optical axis. A pixel location r on the light-receiving area which receives light from the incident angle β (image height: distance from focal position of lens to emission direction) can be determined, provided that a focus distance is f, by the following projecting function according to a predetermined projection model.

$r = f \sin \beta$ (ORTHOGONAL PROJECTION)

$r = f\beta$ (EQUIDISTANT PROJECTION)

$r = 2f \tan\left(\dfrac{\beta}{2}\right)$ (STEREOGRAPHIC PROJECTION)

$r = 2f \sin\left(\dfrac{\beta}{2}\right)$ (EQUISOLID ANGLE PROJECTION)

According to the above expression which corresponds to the projection method selected by the fish-eye lens, a direction (incident angle and rotational angle around axis) is associated with a coordinate of the pixel location on the plane surface image. In the preferred embodiment, the fish-eye lens can perform the stereographic projection shown in FIG. 4C.

In the combining process block 214, the two photographic images obtained by the two imaging optical systems 212A and 212B are combined and the distortion and vertical distortion thereof are corrected, using the information from a not-shown three-axis acceleration sensor. In the image-combining process, at first, the omnidirectional images having a partly overlapped hemisphere image are generated for each of each photographic image configured to be the plane surface image. Then, the positions of the two omnidirectional images including each hemisphere part are adjusted in accordance with the overlapped area-matching operation, and combined. Therefore, the omnidirectional image having a whole sphere is generated.

Figure 5B:
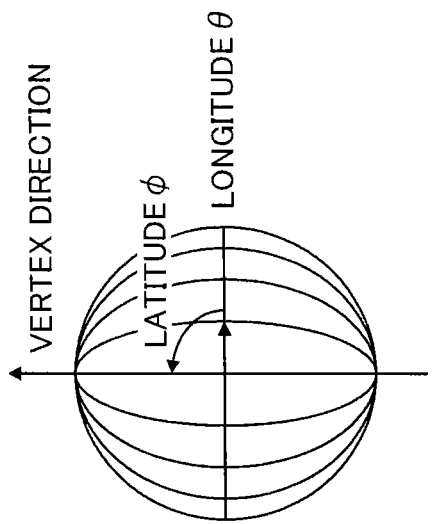
FIGS. 5A and 5B illustrate image data structures of an omnidirectional image-format according to the embodiment of the present invention.
Figure 5A:
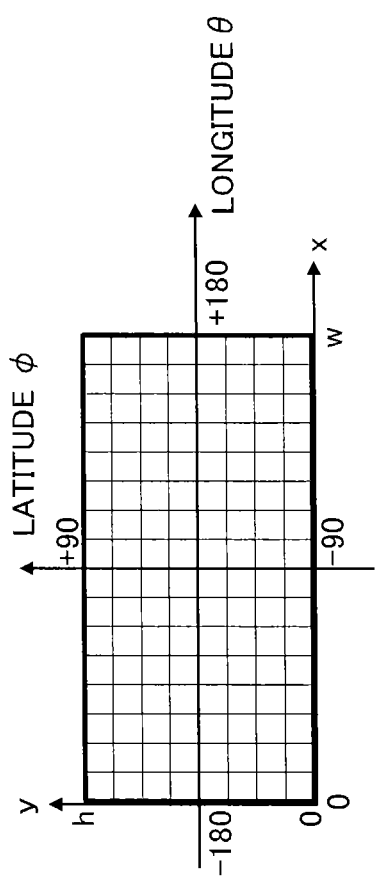

FIGS. 5A and 5B illustrate a data configuration of the image data in the omnidirectional image format used in the present embodiment. As shown in FIG. 5A, the image data in the omnidirectional image format is represented as a pixel value array such that a vertical angle φ to a predetermined axis and horizontal angle θ according to the rotational angle around the predetermined axis are the coordinates. Herein, as shown in FIG. 3, the omnidirectional image is represented in the coordinate system which consists of a perpendicular angle (latitude in latitude-longitude coordinate) having an axis to the vertex direction and a horizontal angle (longitude in latitude-longitude coordinate) around the axis to the vertex direction of the photographed sheen. The perpendicular angle φ is between the range from −90 degrees to +90 degrees and the horizontal angle θ is between the range from −180 degrees to +180 degrees.

Each coordinate value (θ, φ) of the omnidirectional format corresponds to each point on the surface of the sphere which represents the omni-direction centering on the shooting point as shown in FIG. 5B. The omni-direction of the sphere is represented on the omnidirectional image. The plane coordinate of the photographic image which is shot through the fish-eye lens corresponds to the coordinate on the spherical surface of the omnidirectional image format through the above-described projection function and appropriate coordinate conversion.

Hereinbelow, the two-dimensional coordinate indicated in the omnidirectional image format shown in FIG. 5A with the gray axis is the omnidirectional system which starts from the lower left. In the following description, the two-dimensional coordinate converts the horizontal angle value x from 0 to the value according to the number of pixels in the horizontal direction, and converts the vertical angle value y from 0 to the value according to the number of pixels in the vertical direction. For example, when the pixels are configured per 1/10 degree, the horizontal angle value x is within the range from 0 to 3799 and the vertical angle value y is within the range from 0 to 1800. The relationships between the horizontal angle value x and the horizontal angle θ and between the vertical angle value y and the vertical angle φ are indicated in the following Expressions 1 and 2. In the following Expressions 1 and 2, w and h represent each of the image width (for example, 3600 pixels) and the image height (for example, 1801 pixels) of the omnidirectional image format.

$x = w*(\theta+180)/360$ (1)

$y = h*(\phi+90)/180$ (2)

The relationship between the two-dimensional coordinate (x, y) of the omnidirectional image shown in FIG. 5A and the three-dimensional coordinate (xs, ys, zs) of the omnidirectional surface is calculated by the following Expressions 3 and 4. The three-dimensional coordinate shown in FIG. 5B is the right-handed system of which the original point starts from the center of the sphere, and herein, r represents the radius of the sphere.

$$\begin{pmatrix} xs \\ ys \\ zs \end{pmatrix} = \begin{pmatrix} r\cos(\phi)\sin(\phi) \\ r\sin(\phi) \\ r\cos(\phi)\cos(\phi) \end{pmatrix}$$ (3)

$$\begin{pmatrix} \theta \\ \phi \end{pmatrix} = \begin{pmatrix} 2\pi(x - w/2)/w \\ \pi(y - h/2)/h \end{pmatrix}$$ (4)

In the embodiment described herein, the relationship between the two photographic images imaged by the two imaging optical systems 212A and 212B (photographic image A and photographic image B) and the image range of the omnidirectional image is represented by "omnidirectional image" as shown in FIG. 3. The combined omnidirectional image is recorded in the internal memory or the external recording medium in the predetermined format. The file format for recording the omnidirectional image can be a still-image without compression such as a bitmap. Also, a compressed still image format such as a JPEG (Joint Photographic Experts Group), GIF (Graphics Interchange Format), and PNG (Portable Network Graphics) can be adoptable. Furthermore, in another embodiment, the omnidirectional image can be recorded as a frame image in motion picture format such as a MPEG (Moving Picture Experts Group) and AVI (Audio Video Interleave). In the embodiment described hereinbelow, the omnidirectional image is described as a still-image.

In the function block of the image processor 250, the omnidirectional image is stored in the omnidirectional image storage part 256 and then, input and converted to the output image through the image processing by the plane image generator 260. In the preferable embodiment, the omnidirectional image to be input is imaged by the omnidirectional imaging device 110 but the origin of the omnidirectional image is not always limited. For example, a predetermined image process can be performed with the photographic image or the image generated through computer graphics can be included.

The plane image generator 260 receives the input value including the above-described pan designation value, tilt designation value and zoom designation value as a result of the changing operation of the output range from the user input receiver 258. The plane image generator 260 determines an image generation parameter according to the input value as follows, and performs the image generation process of the output image according to the decided image-generation parameter.

As described above, the omnidirectional image can be related to the three-dimensional coordinate by the above Expressions 3 and 4. In the above image-generation process, the three-dimensional model having an inside surface to which the input omnidirectional image is attached is constructed. Then, the output image S can be obtained by projecting and displaying the three-dimensional model through a virtual camera (hereinafter, referred to as a camera) under a predetermined condition.

Figure 6:
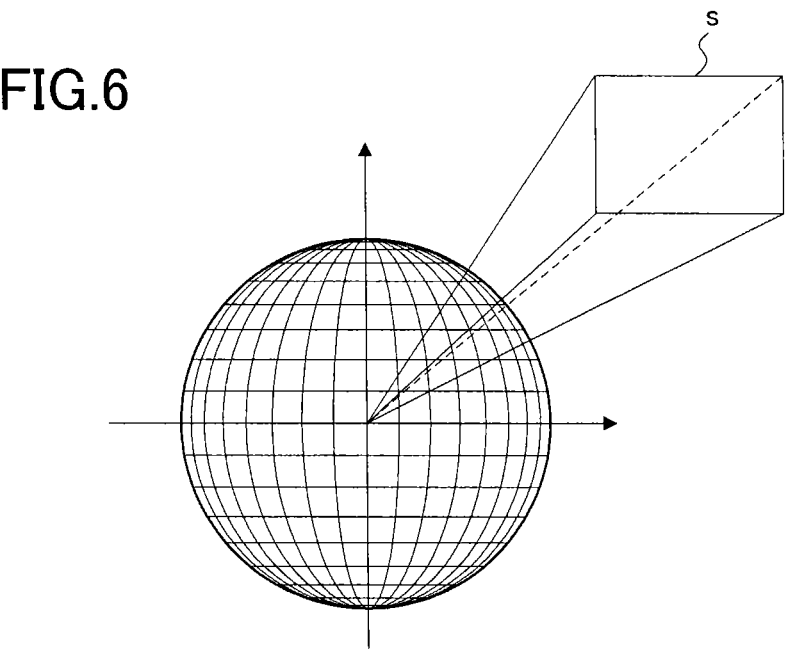
FIG. 6 illustrates a perspective projection performed in a three-dimensional graphic display.

FIG. 6 illustrates the perspective projection performed in a three-dimensional graphics display. As shown in FIG. 6, the plane image generator 260 generates the output image of the plane image by the perspective projection of the three-dimensional model having the omnidirectional image attached to the inner surface of the sphere. The image generation parameter during the perspective projection is determined according to the input value. The image generation parameter in a particular embodiment includes a position d, direction v, viewing angle θ, and projection range zNear and zFar of a camera.

The output image S has a view which can be seen in the particular angle of field θ when the three-dimensional model is viewed from the center of the sphere facing the particular latitude/longitude direction v. And herein, the image is cut according to the shape of the display area. The parameter of the above projection range (zNear and zFar) defines the range of the perspective projection appropriately. The method to determine the image generation parameter and the projecting process will be described in detail with reference to FIGS. 7-12 later.

In the embodiment as shown in FIG. 2, the imaging optical system 212 and the combining process block 214 are configured as the components on the omnidirectional imaging device. The input part 252, output part 254, omnidirectional image storage part 256, user input receiver 258, plane image generator 260 and image output part 262 are decentrally-installed as the components on the image processor. However, the embodiment of the installation is not particularly limited to the above.

In another embodiment, the omnidirectional image display system can be configured to include all components on a single device. Furthermore, in another embodiment, each of the arbitral portions of the components is disposed on one of the plural devices configuring the whole omnidirectional image display system. For example, in a particular embodiment, it is possible to have the configuration such that the image processor includes the image-combining process block, receives two photographic images from the omnidirectional imaging device, and forms the omnidirectional image.

Figure 7:
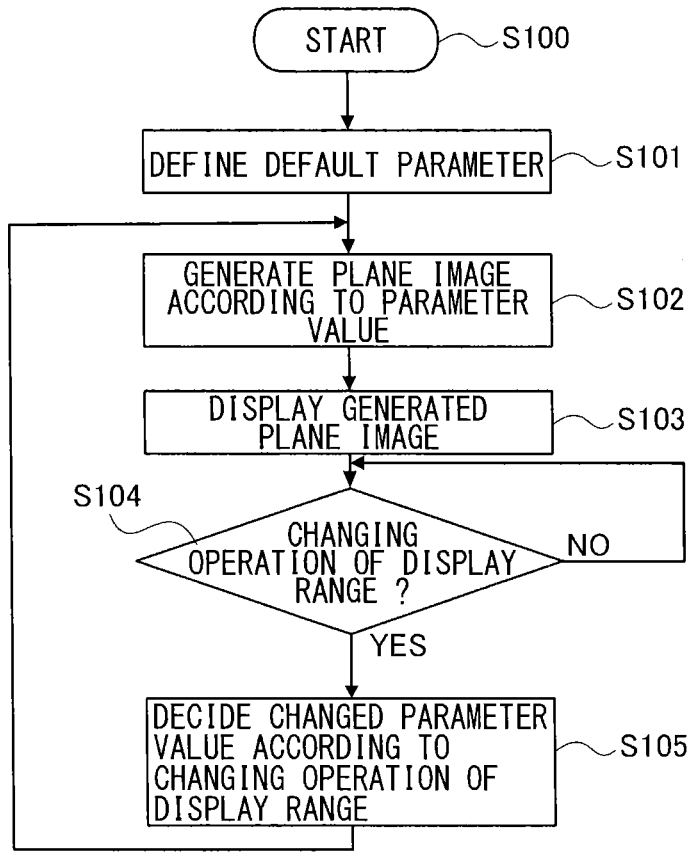
FIG. 7 is a flow chart illustrating the omnidirectional image display process performed by an image processor according to the embodiment of the present invention.
Figure 8:
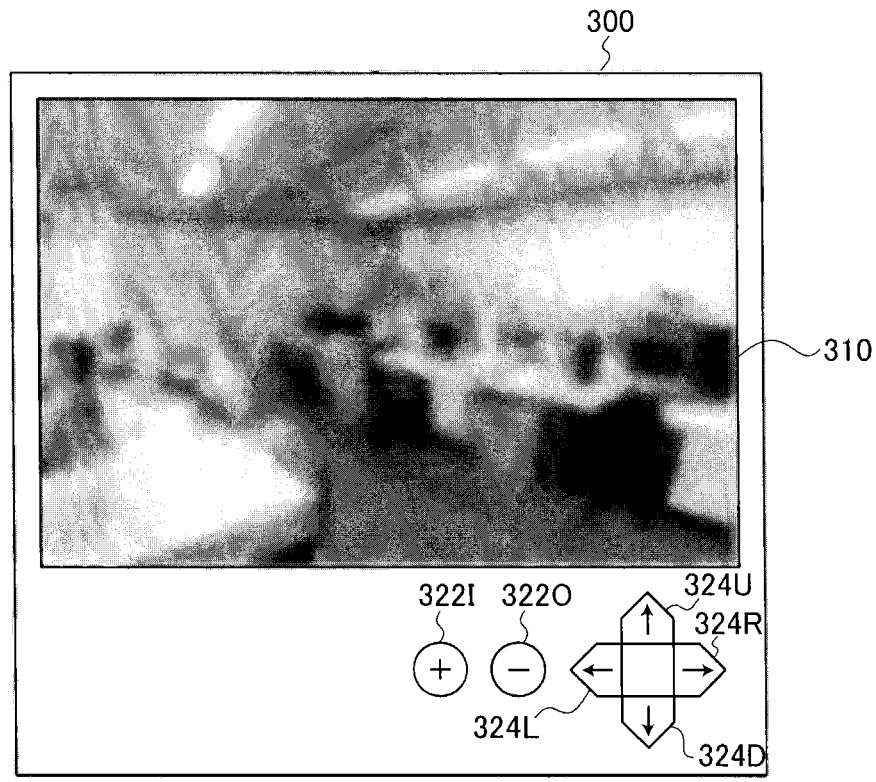
FIG. 8 illustrates an example of an image viewer screen displaying an omnidirectional image in a predetermined range.

Hereinbelow, with reference to FIGS. 7 and 8, the flow of the omnidirectional image output process according to the present embodiment is described in detail. First of all, as the output process, the description of the display process on the image viewer surface where the omnidirectional image is displayed is given. FIG. 7 is a flow-chart illustrating the omnidirectional image display process performed by the image processor according to the present embodiment. FIG. 8 illustrates an example of an image viewer surface which displays the omnidirectional image in a predetermined range.

The process shown in FIG. 7, for example, starts from step S100 by the operator in the image processor 250, in response to the performance of displaying a command which identifies the predetermined omnidirectional image. In step S101, the image processor 250 determines the original image-processing parameter according to the predetermined designation values of pan, tilt and zoom, through the plane image generator 260. In step S102, the image processor 250 generates the plane image from the omnidirectional image according to the determined image-processing parameter through the plane image generator 260.

In step S103, the image processor 250 displays the generated plane image on the predetermined position of the image viewer surface by the image output part 262. The image viewer surface 300 shown in FIG. 8 includes an image display area 310 and the GUI members (Graphical User Interface) 322 and 324 to change the display range of the image which is to be displayed on the image display area 310. On the image display area 310, the output image which has the range according to the input value, and is generated through the above plane image generator 260 is displayed by the image output part 262.

In step S104, the image processor 250 determines whether the operation of changing the display area is accepted by the user input receiver 258 or not. Herein, the operation of changing the display area is detected through the operation event of a click, flick and so on which is performed on the corresponding GUI members 322 and 324. The image viewer surface 300, shown in FIG. 8 as an example, includes a GUI member 3221 waiting for a zoom-in command and a GUI member 3220 waiting for a zoom-out command for changing the zoom designation value. The image viewer display 300 further includes a left button 324L and a right button 324R waiting for a pan command in the left and right directions and an upper button 324U and a lower button 324D waiting for a tilt command in the up-and-down directions, for changing the pan and tilt designation values.

The operation of changing the display range can be detected through the operation events such as a shortcut key, gesture and multi-touch operation corresponding to each operation of changing the display range, in addition to the operation to the GUI members. For example, as a shortcut key, a plus button and a minus button on a keyboard to instruct zoom-in and/or zoom-out can be included. Otherwise, the key operation to the buttons having left/right and up/down arrows which instruct right and left pan and up-and-down tilt can be the shortcut key. As the multi-touch operation, the pinch-in and pinch-out operations corresponding to the zoom operation can be performed.

In Step S104, until the operation for changing the display range is accepted (No in Step S104), the process is looped in the step S104 waiting for the changing operation of the display range. When it is determined that the operation for changing the display range is accepted in the step S104 (YES in step S104), the process proceeds to step S105.

In step S105, according to the pan, tilt and zoom designation values determined as a result of the operation for changing the display range, the changed image-processing parameter is decided, and the process proceeds to step S102. In the following step S102, the generation process of the plane image is performed according to the image-processing parameter after being changed by the plane image generator 260. In step S103, the image display area 310 of the image viewer surface 300 is updated by the image output part 262 with the plane image newly generated according to the user operation.

Figure 9:
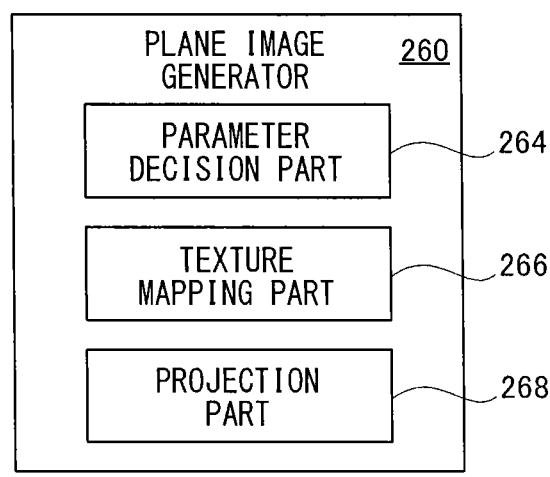
FIG. 9 is a block chart of a function of a plane image generator disposed on the image processor according to the embodiment of the present invention.

Hereinbelow, the omnidirectional image output process according to the present embodiment is described in detail with reference to FIGS. 9-11E. FIG. 9 illustrates the function block of the plane image generator 260 disposed on the image processor according to the present embodiment in detail. The plane image generator 260 shown in FIG. 9 includes a parameter decision part 264, texture mapping part 266, and projection part 268.

The parameter decision part 264 is a decision part which decides the image generation parameter including the position of the viewing point d and viewing angle θ of a camera according to each of the input values such as pan, tilt and zoom designation values which is received from the user input receiver 258.

The texture mapping part 266 is a generator which generates the three-dimensional model in which the omnidirectional image to be displayed is attached to the predetermined three-dimensional conformation. The three-dimensional model can be generated by the method of so-called texture mapping. Texture mapping is a common graphic process in the Open GL which corresponds to the GPU provided in the information terminal device having a limited calculation performance such as a smartphone and tablet terminal. The texture mapping process is such that the texture image is attached on the surface of the three-dimensional conformation, the texture mapping part 266 reads the selected omnidirectional image, sends it to a texture buffer which stores the texture, and allocates it to the three-dimensional model.

In the embodiment described herein, various kinds of models having three-dimensional conformation can be used which are a sphere, circular cylinder and another model which are capable of projecting the output image without the viewer experiencing distortion or the like. In order to prevent the viewer from experiencing distortion or the like, and to simplify the calculating process, a sphere is preferably used. The model having a three-dimensional conformation includes at least one inner side and a spherical surface to which the omnidirectional image is attached when the model is a sphere.

The projection part 268 is a projector which generates an output image. The output image is generated by projecting the image of the three-dimensional model having the omnidirectional image through the camera in which the viewing point is set to a particular position according to the image generation parameter which is decided by the parameter decision part 264. The output image is accomplished by rendering the image of the three-dimensional model, as viewed from an arbitrary viewpoint of the camera with the predetermined condition, after the texture mapping is applied.

According to the Non-patent document 1, it is effective that the projection method varies depending on the wide-field display or the narrow-field display. However, if a plurality of projecting methods is continuously performed, the requirements of the performance of the image processor become more complex.

Therefore, in the present embodiment, in order to simplify the hardware requirements of the image processor, the plane image generator 260 adopts a configuration which obtains an appropriate display effect suitable to be monitored by a viewer by changing the image generation parameter of the display model through a single projection method. Hereinbelow, the decision process of the image generation parameter according to the input value is described in detail with reference to FIGS. 10-11E. In the embodiment described herein, the perspective projection is performed as the projection method; however, another projection method such as orthogonal projection can be also adoptable in another embodiment.

As described above, in the particular embodiment which performs the perspective projection as the projection method, the image generation parameter includes the position of the viewing point d, direction v, viewing angle θ, and projection range zNear and zFar of a camera. In the three-dimensional computer graphics, typically, a world coordinate system, model coordinate system, and camera coordinate system are defined. The world coordinate system defines an absolute three-dimensional space. The camera and object are provided in the three-dimensional space defined by the world coordinate system. The model coordinate system is a coordinate system centering on the prescribed object. In the embodiment described herein, a spherical model is constructed and disposed on the original point of the world coordinate system. Accordingly, the world coordinate system and the model coordinate system of the spherical model have the original point in common and a different axis for each. The camera coordinate system represents the direction v of the viewing field centering on the viewpoint of the camera.

The projection part 268 displays the projection image which is obtained by projecting the spherical model having the inner surface to which the omnidirectional image is attached, on the two-dimensional screen from the viewpoint of the camera. The screen is disposed on the plane surface which passes through the original point of the camera coordinate system, and the omnidirectional image is projected by the perspective projection on the screen.

Figure 10:
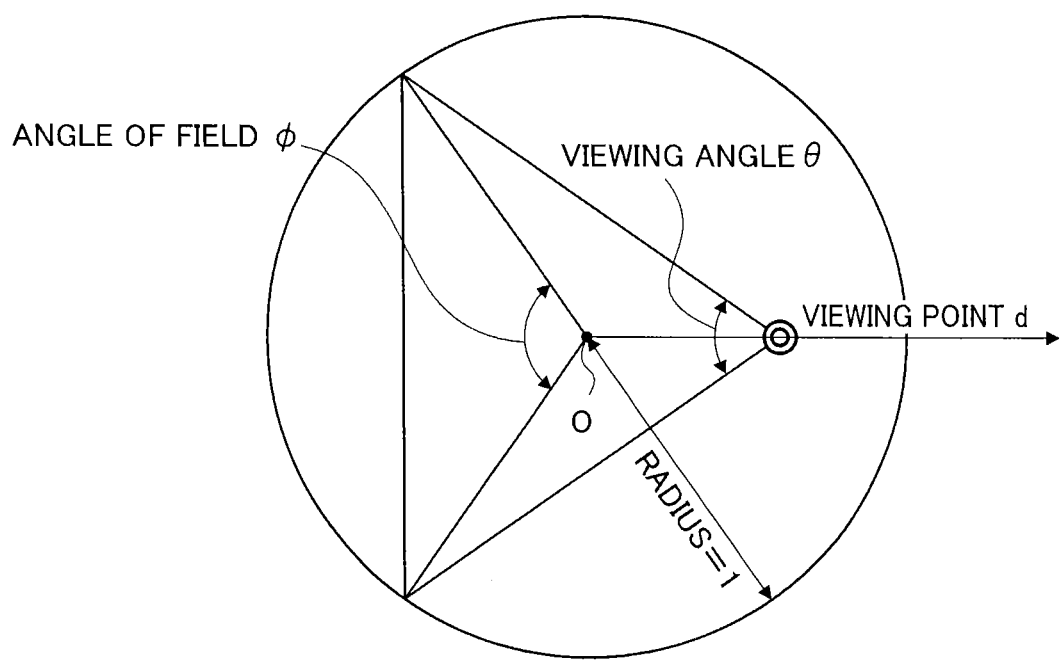
FIG. 10 illustrates a relationship between a model coordinate system, position of a viewing point (d), viewing angle (θ) and angle of field (φ) of a camera.

FIG. 10 illustrates the relationship between the model coordinate system, position of the viewing point d, viewing angle θ of the camera, and the angle of field φ which represents the range of the image having such a viewing field. When the viewing point of the camera is located on the center of the spherical model, the angle of field φ which represents the range of the image having such a viewing field conforms to the viewing angle θ of the camera. As indicated with a double circle mark in FIG. 10, the viewing angle θ and angle of field φ of the camera each have a different value when the position of the viewing point d of the camera is away from the center of the three-dimensional model. The zoom-in/out performance corresponds to the changing operation of the angle of field φ of the camera. In the embodiment described herein, the variation of the angle of field φ of the camera is generated by changing either the viewing point d or viewing angle θ of the camera according to the range of the zoom designation value.

The changing performance of the image generation parameter which corresponds to the operation regarding the display range of pan, tilt and zoom according to the present invention is shown in the following Table 1.

TABLE 1

| USER CONTROL | TARGET COORDINATE SYSTEM TO BE CHANGED ACCORDING TO WORLD COORDINATE SYSTEM | OPERATION TO TARGET COORDINATE SYSTEM |
|---|---|---|
| ZOOM | CAMERA COORDINATE SYSTEM | CHANGE OF ORIGINAL POINT OR VIEWING ANGLE |
| CHANGE OF DISPLAY POSITION (PAN, TILT) | MODEL COORDINATE SYSTEM | ROTATION |

Herein, in Table 1, the movement of the image display position according to tilt and pan is achieved by fixing the direction of the viewing field and rotating the sphere model on the world coordinate system to be transformed. However, in another embodiment, the image display position can be changed by changing the direction v of the viewing field of the camera while fixing the spherical model on the world coordinate system.

Hereinbelow, with reference to FIGS. 11A-11E, the decision process of the image generation parameter according to the zoom designation value of the present embodiment is described in detail. FIGS. 11A-11E are views illustrating the method of determining the image generation parameter according to the zoom designation value. The output image and the display range of the sphere model are also illustrated. FIGS. 11A-11E illustrate the method of determining the image generation parameter in which the particular zoom designation value z is provided as shown in FIGS. 11A-11E.

The image generation parameter which is determined in accordance with the zoom designation value z, the display magnification and the angle of field φ in that regard are shown in the following Table 2. In the following Table 2, viewWH represents the width or height of the display area of the output image. It represents the width of the display area when the display area has a horizontally-long shape and represents the height when the display area has a vertically-long shape. In the following Table 2, imgWH represents the width or height of the image. It represents the width of the image when the display area has a horizontally-long shape and represents the height of the image when the display area has a vertically-long shape. imgDeg represents the angle of the display range of the image, in which the image width is 360 degrees and the image height is 180 degrees.

the range of A to B is determined to the value corresponding to the angle of field φ and the zoom designation value z as shown in the calculation formula in Table 2, from the original point O shown in FIG. 11A to 1 of FIG. 11B corresponding to the outer edge of the spherical model.

When the zoom designation value z is within the range of B to C which is more wide-angle side than the range of A to B, as shown in FIGS. 11B and 11C, the position of the viewing point d of the camera is fixed to the outer edge of the spherical model (d=1), and the angle of field φ is extended according to the expansion of the viewing angle θ of the camera. The viewing angle θ of the camera increases from 60 degrees which is fixed in the range from A to B to 120 degrees, in accordance with the calculation formula, θ=φ/2. The angle of field φ, which represents the range of the image coming out in the viewing field, is coincident with the zoom designation value z in the range of A to B and the range of B to C, and monotonously increases.

When the zoom designation value z is in the range of C to D and the range of D to E which are on the wide-angle side than the range of B to C, the output image and the display range of the sphere model are as shown in FIG. 11C, 11D or 11E. Namely, when the position of the viewing point d of the camera is moved to the direction which is apart from the center again with the viewing angle θ being fixed at 120 degrees, the angle of field φ is expanded. The position of the viewing point d of the camera is determined in accordance with the calculation formula indicated in Table 2 and corresponds to the zoom designation value z. The angle of field φ does not conform to the zoom designation value z in the range of C to D and the range of D to E.

TABLE 2

| RANGE | DISPLAY MAGNIFICATION | ZOOM DESIGNATION VALUE Z | ANGLE OF FIELD φ | IMAGE GENERATION PARAMETER TO BE CHANGED | | REMARKS |
|---|---|---|---|---|---|---|
| A~B | viewWH/imgWH *imageDeg/φ | 60~120 φ = z | 60~120 DEGREES | POSITION OF VIEWING POINT d = 0~1 | POSITION OF VIEWING POINT d = φ/60−1 | MOVEMENT OF CAMERA IN SPHERE VIEWING ANGLE θ = 60 DEGREES |
| B~C | | 120~240 φ = z | 120~240 DEGREES | VIEWING ANGLE θ = 60~120 | VIEWING ANGLE θ = φ/2 | POSITION OF VIEWING POINT d = 1 FIXED |
| C~D | | 240~268.5 φ ≠ z | 240~300 DEGREES | POSITION OF VIEWING POINT d = 1~dmax1 | POSITION OF VIEWING POINT d = 1 + (dmax2 − 1) *(z − 240) 120 | VIEWING ANGLE θ = 120 DEGREES FIXED MAXIMUM VIEWING ANGLE CORRESPONDS TO SIZE OF DISPLAY RANGE |
| D~E | viewWH/imgWH *360/φ *tan(asim(1/d)/ tan(θ/2)) | 268.5~300 φ ≠ z | 300~278 DEGREES | POSITION OF VIEWING POINT d = dmax1~dmax2 | POSITION OF VIEWING POINT d = 1 + (dmax2 − 1) *(z − 240) 120 | VIEWING ANGLE θ = 120 DEGREES FIXED MAXIMUM ANGLE OF FIELD CORRESPONDS TO SIZE OF DISPLAY RANGE |

In the present embodiment, the range of the zoom designation value z is, as indicated in Table 2, separated into four ranges including the range from A to B, from B to C, from C to D, and from D to E. The zoom designation value z corresponds to the required angle of field to be displayed. In the embodiment described herein, the angle of field is designated within the range from 60 degrees at the minimum to 300 degrees at the maximum by the user.

Regarding the zoom-out performance, the viewing angle θ of the camera is fixed to 60 degrees when the zoom designation value z is within the range of A to B. Because the position of the viewing point d of the camera is away from the center, the angle of field φ is extended as illustrated in FIGS. 11A and 11B. The position d of the camera within dmax1 in Table 2 corresponding to the position d illustrated in the FIG. 11D corresponds to a distance where the sphere model is displayed with the maximum angle of field on the full width and height of the rectangle display area, as shown in FIG. 11D. In the particular embodiment, dmax1 can be calculated by the following formula 5. dmax2 in Table 2 corresponding to the position d illustrated in the FIG. 11E corresponds to a distance where the spherical model is displayed with the maximum angle of field such that the spherical model has contact with the inside of the rectangular of the display area as shown in FIG. 11E. In the particular embodiment, dmax2 can be calculated by the following formula 6.

$$dmax1 = \frac{1}{\sin\left(atan\left(\tan\left(\frac{\Theta}{2}\right) * \frac{(viewW^2 + viewH^2)^{\frac{1}{2}}}{viewW}\right)\right)} \quad (5)$$

$$dmax2 = \frac{1}{\sin\left(atan\left(\tan\left(\frac{\Theta}{2}\right) * \frac{viewH}{viewW}\right)\right)} \quad (6)$$

In the above formulas 5 and 6, viewW and viewH represent the width and height of the display area. Accordingly, the values of dmax1 and dmax2 depend on the size of the display surface (width, height, length of diagonal line). dmax2 corresponds to the longest distance of the viewing point of the camera and the zoom designation value z is limited according to the size of the display area. By limiting the zoom designation value z such that the viewing point of the camera is located within the range as indicated in Table 2 (to dmax2), the zoom out operation can be finished in a condition in which the image fits on the display image or the omnidirectional image is displayed as a predetermined spherical form at a predetermined magnification. Thereby, the display image can be visually recognized as the omnidirectional image by the viewer, and the zoom out operation can be finished without experiencing any distortion or the like.

It is obvious from the Table 2 and FIGS. 11A-11E, in each of the above-described ranges, the angle of field φ continues, but it does not uniformly increase by the zoom out operation to the wide-angle side. Namely, in the range of C to D and the range of D to E in which the position of the viewing point of the camera is changed, the angle of field φ increases in accordance with an increase in a distance from the center of the spherical model to the position of the viewing point d of the camera. However, the angle of field φ decreases in accordance with an increase in a distance in the range of D to E. It is derived from that the external area of the spherical model comes out in the viewing field. By moving the position of the viewing point d of the camera in the wide-angle area having the zoom designation value of 240 degrees or more, the display operation can be performed with less distortion or the like and the angle of field φ can be changed.

Accordingly, the angle of field φ basically increases when the zoom designation value is changed to the wide-angle direction. In this regard, the increase of the viewing angle θ of the camera is controlled, and open feeling during the wide-angle display is achieved as a result of which the camera is apart from the model coordinate system, so that the distortion of the image can be lowered. In addition, since the motion of moving away of the camera is similar to the actual motion of a human of confirming a wide range, it can be said that the zoom out movement has lower distortion. The angle of field φ decreases as the zoom designation value is changed to the wide-angle side in the range of D to E, and the viewer feels like moving apart from the sphere. Thereby, the zoom out operation has less distortion.

According to the above description, in each range, either one of the position of the viewing point d or viewing angle θ of the camera is changed and the other is fixed. However, in another embodiment, one of the position of the viewing point d and viewing field θ of the camera can be preferentially changed and the other is changed by a relatively small changing value. As described above, the method of determining image generation parameter corresponds to the zoom out performance, but the image generation parameter can be determined upon the zoom in performance.

Figure 12:
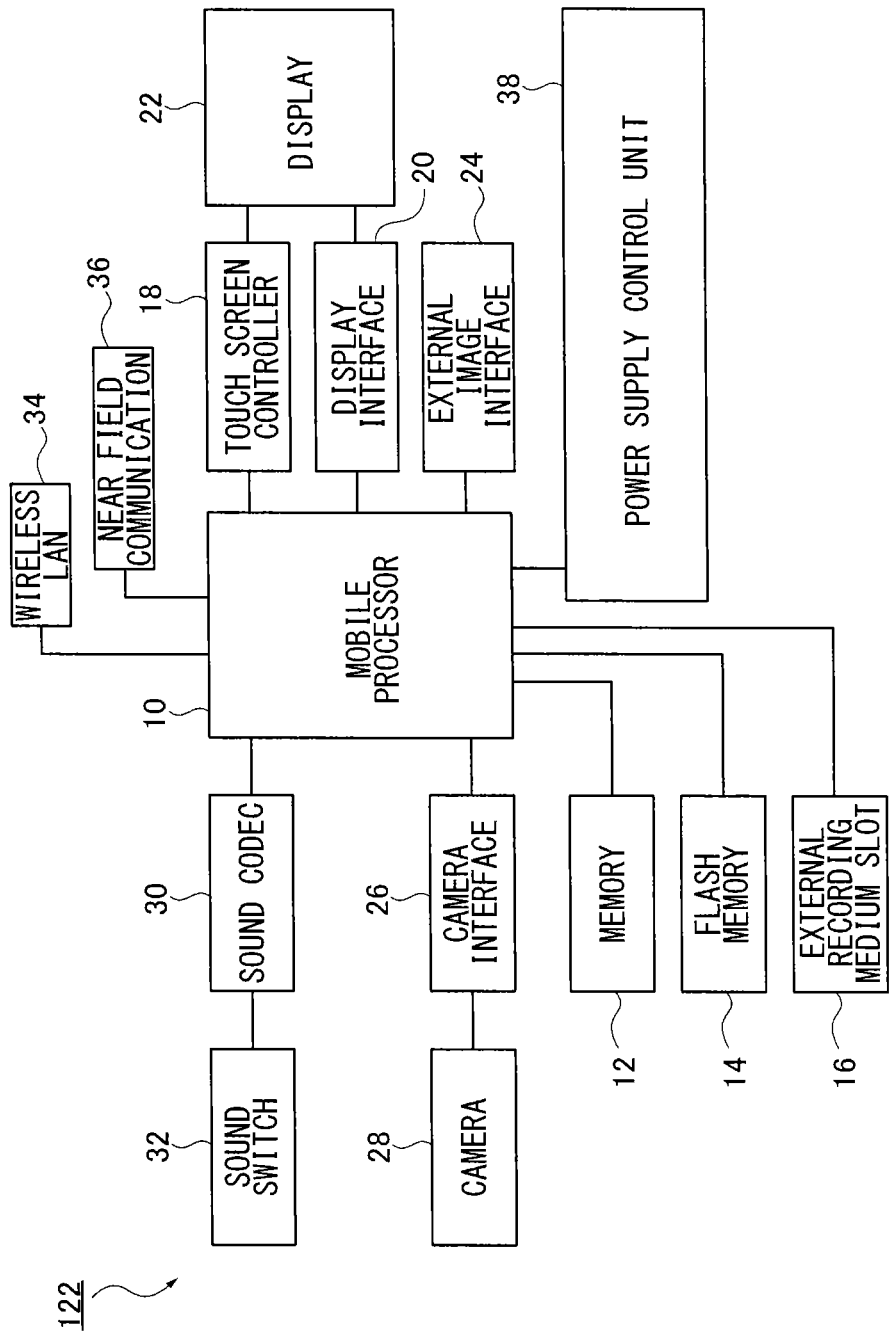
FIG. 12 illustrates a configuration of hardware of the image processor according to the embodiment of the present invention.

Hereinbelow, with reference to FIG. 12, the hardware configuration of the image processor according to the present embodiment is described. FIG. 12 illustrates the hardware configuration of the image processor according to the present embodiment. The image processor according to the present embodiment is configured as a mobile information terminal device such as a tablet terminal 122. The tablet terminal 122 shown in FIG. 12 includes a mobile processor 10 of which a single core or multi-core CPU (Central Processing Unit), GPU, baseband processor, and memory controller are integrated as a SoC (System on Chip); a memory 12 such as LPDDR (Low-Power Double Database) SDRAM which is connected to the mobile processor 10 and provides a working area such as CPU; a flash memory 14 and a slot of an external recording medium 16 such as an SD card.

The flash memory 14 stores an OS to control the tablet terminal 122, a control program to perform the above-described function parts, various system and setting information, and user data including the above-described omnidirectional image. The recording medium which stores the user data such as the omnidirectional image is inserted to the slot of the external recording medium 16.

The mobile processor 10 is connected to the display screen 22 including a touch-screen sensor through a touch-screen controller 18 and a display interface 20. The various setting screens and application screens are displayed on the display screen 22. In the present embodiment, the image viewer screen including the output image generated from the omnidirectional image can be displayed on the display screen 22. In addition, the tablet terminal 122 further includes an image output interface 24 of the HDMI (High-Definition Multimedia Interface) which is connected to the mobile processor 10 and is capable of connecting to the external display and/or projector.

The tablet terminal 122 further includes a camera 28 having an image sensor such as a CMOS (Complementary Metal Oxide Semiconductor). The camera 28 is connected to the mobile processor 10 through a camera interface 26. The tablet terminal 122 further includes a sound codec 30 which performs a sound encode and decode process and a sound switch 32 switching the sound of a headphone or speaker.

A wireless LAN port 34 and a Near Field Communication port 36 such as Bluetooth (Registered trademark) are further connected to the mobile processor 10 so that the mobile processor 10 is capable of connecting to the external device by wireless communication. In the embodiment described herein, the tablet terminal 122 is connected to the external omnidirectional imaging device 110 through the wireless LAN port 34 or the Near Field Communication port 36. The tablet terminal 122 includes a power control unit 38 and thereby the external power supply and battery of the tablet terminal 122 are controlled.

The tablet terminal 122 according to the present embodiment reads the control-program from the flash memory 14 and expands it in the working space provided by the memory 12, and thereby the above-described function parts and processes can be achieved under the control of the CPU which is integrated in the mobile processor 10. In that regard, the calculation function of the GPU which is integrated in the mobile processor 10 is called through the API for a graphic process such as Open GL, and the above-described texture mapping process and the image calculation such as the projection process are performed.

According to the above-described embodiment, the image-processing system, image-processing method, and program in which the distortion or the like caused by the expansion of the up-and-down and right and left edges of the subject is lowered in the display of the image of wide-angle area, a high-speed display is achieved, and the requirements reagarding the arithmetic capacity are reduced can be provided.

According to the above-described embodiment, because the display model is constructed as a single projection method, real time and smooth zoom-display can be achieved even in the image processor having the limited function of image calculation. Zoom out is achieved by moving the position of the viewing point of the camera apart from the three-dimensional model, so that the increase of the viewing angle is minimized and the distortion of the image can be lowered although the feeling of expansion still exists.

The above-described function parts can be represented by a program which is capable of being performed by a computer and is described in programming language such as assembler, C, C++, C#, and Java (Registered trademark) or object-oriented programming language. They can be stored in a disposable recording medium such as ROM, EEPROM, EPROM, flash memory, flexible disc, CD-ROM, CD-RW, DVD-ROM, DVD-RAM, DVD-RW, blue-ray disc, SD card, and MO, or distributed through an electric communication line. A part of or all of the above-described function parts can be mounted on a programmable device (PD) such as a field-programmable gate array (FPGA), for example. Otherwise, they can be mounted as an ASIC (Application-Specific Integrated Circuit). They can be also distributed through a recording medium as circuit configuration data (Bit stream data) which is downloaded in a PD in order to represent the above-described function parts on the PD, or data described by HDL (Hardware Description Language), VHDL (VHSIC, "Very High Speed Integrated Circuits" Hardware Description Language), and Verilog-HDL for generating circuit configuration data.

From the above-described configuration, the requirement for calculation performance when performing high-speed display can be lowered while the distortion or the like caused by the expansion of the up-and-down and right and left edges of the subject is minimized in the display of the image in a wide-angle area.

Although the embodiments of the present invention have been described above, the present invention is not limited thereto. It should be appreciated that variations may be made in the embodiments and the aspects described by persons skilled in the art without departing from the scope of the present invention by another embodiment, addition, change or reduction. Any embodiment is included in the range of the present invention as long as it includes the function and advantageous effect according to the present invention.

What is claimed is:

1. An apparatus, comprising:
   a memory for storing program code; and
   a processor for generating an image using a stored image, the processor, according to the program code, executing:
      a process to display the image as a three-dimensional conformation; and
      a process to zoom the image by:
         changing a size of a viewing angle of the image, the viewing angle being an angular width between a position of a viewing point and both edges of the image when the viewing point sees the image from the position of the viewing point; and
         changing the position of the viewing point of the image, wherein:
            an angle of field is an angular width which is a range of the image having the viewing field,
            the processor makes the viewing angle different from the angle of field within a magnification range, and
            the processor operates such that the position of the viewing point is on an outer edge of the three-dimensional conformation while changing the size of the viewing angle within a first magnification range, and the size of the viewing angle is constant while changing the position of the viewing point away from the outer edge of the three-dimensional conformation within a second magnification range which is larger than the first magnification range.

2. The apparatus according to claim 1, wherein the processor generates the image as an image of a three dimensional model to which a captured image is attached to be the three-dimensional conformation.

3. The apparatus according to claim 1, wherein the processor changes the size of the viewing angle monotonously within an entirety of the magnification range.

4. The apparatus according to claim 1, wherein the processor generates the image as an image of a sphere within a range having a magnification smaller than the magnification range.

5. The apparatus according to claim 1, wherein the processor executes:
   the changing of the position of the viewing point of the image while zooming the image operates such that the position of viewing is moved along a line which includes a center of the image and a current viewing point.

6. The apparatus according to claim 1, wherein the viewing point of the image is a simulated viewing point of the image.

7. The apparatus according to claim 1, wherein:
   the processor makes the position of the viewing point to be in mathematical correspondence to the viewing angle within the magnification range, while zooming.

8. A process to zoom a digitally stored image, comprising:
   changing, while zooming, a size of a viewing angle of the image, the viewing angle being an angular width between a position of a viewing point and both edges of the image when the viewing point sees the image from the position of the viewing point, within a first magnification range in which the position of the viewing point is on an outer edge of a three-dimensional conformation;
   changing, while zooming, the position of the viewing point of the image away from the outer edge of the three-dimensional conformation while keeping the viewing angle constant, within a second magnification range which is larger than the first magnification range; and
   displaying the image as the three-dimensional conformation, wherein:
      an angle of field is an angular width which is a range of the image having the viewing field, and
      the viewing angle is different from the angle of field within a magnification range.

9. The process according to claim 8, wherein the changing of the viewing angle changes the size of the viewing angle monotonously within an entirety of the magnification range.

10. The process according to claim 8, wherein the displaying of the image displays an image of a sphere within a range having a magnification smaller than the magnification range.

11. The process according to claim 8, wherein the changing of the position of the viewing point comprises:
  changing the position of the viewing point such that the position of viewing is moved along a line which includes a center of the image and a current viewing point.

12. The process according to claim 8, wherein the viewing point of the image is a simulated viewing point of the image.

* * * * *